Sept. 8, 1964 T. W. GRIFFITH 3,147,942
CLOSURE AND LOADING DEVICE
Filed June 6, 1963 8 Sheets-Sheet 1
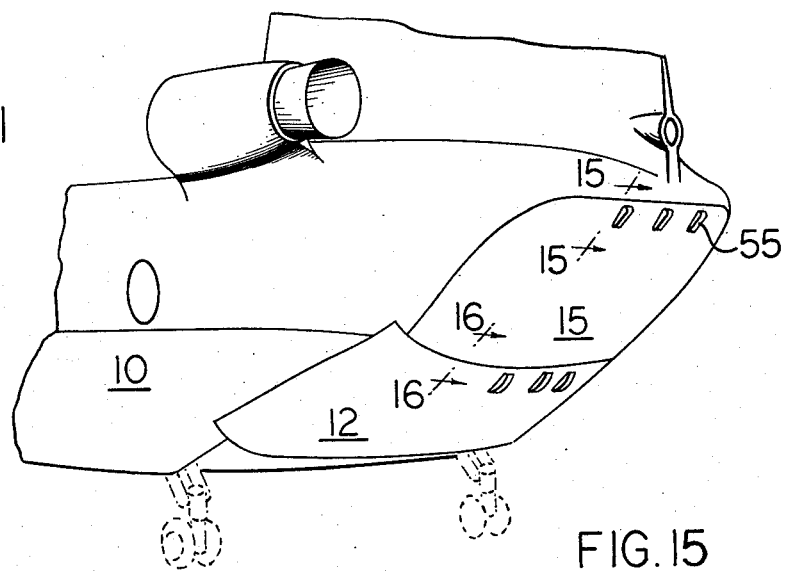
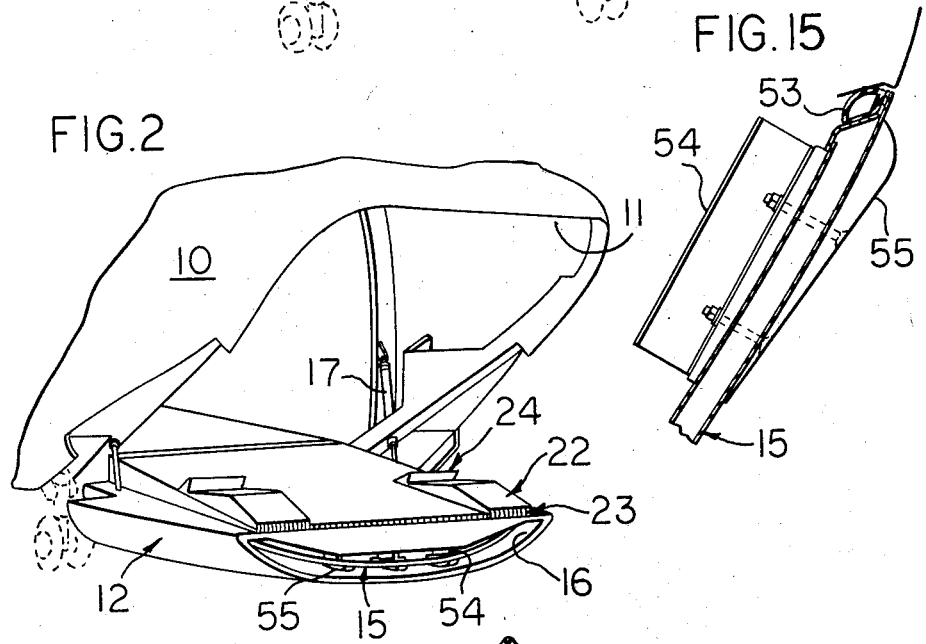
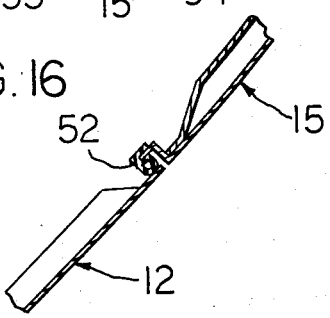
INVENTOR.
THOMAS W. GRIFFITH
BY
HIS ATTORNEY

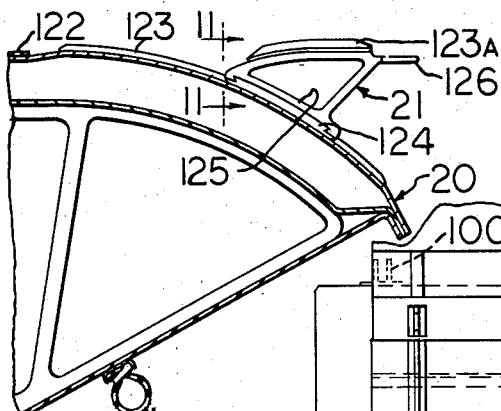
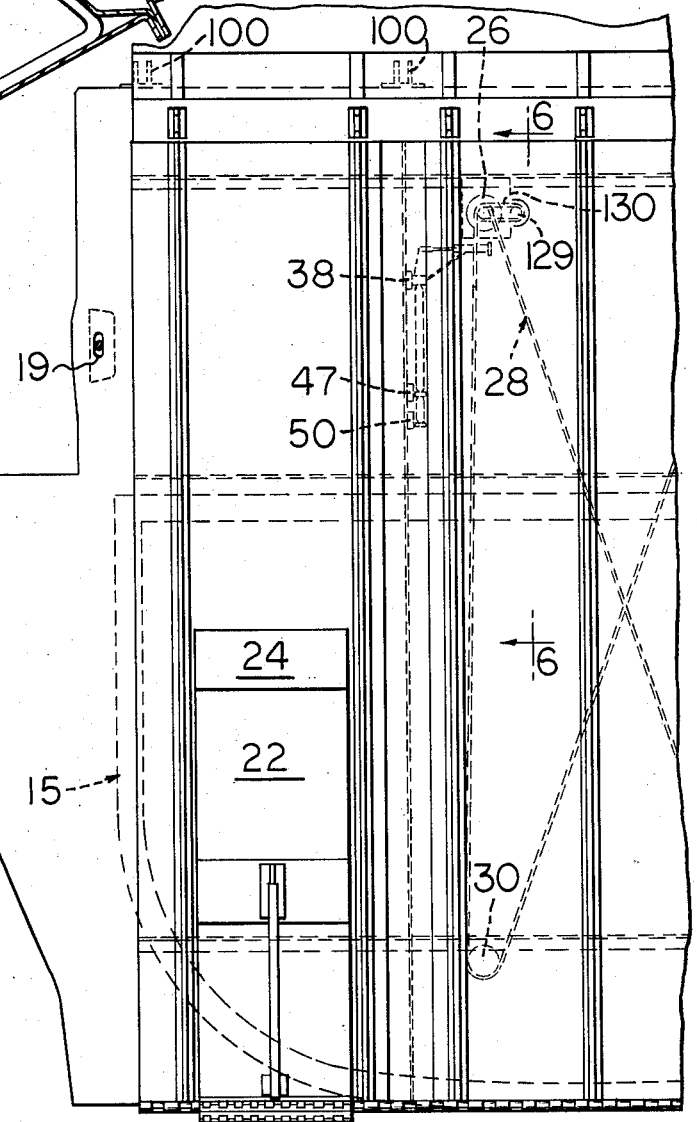
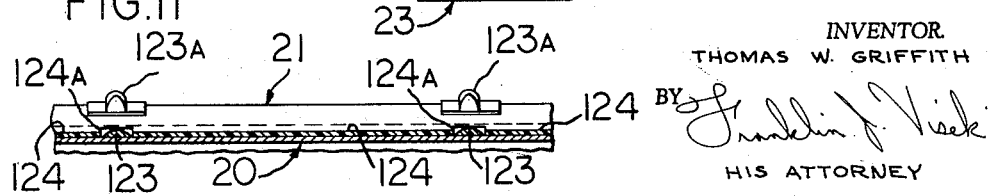

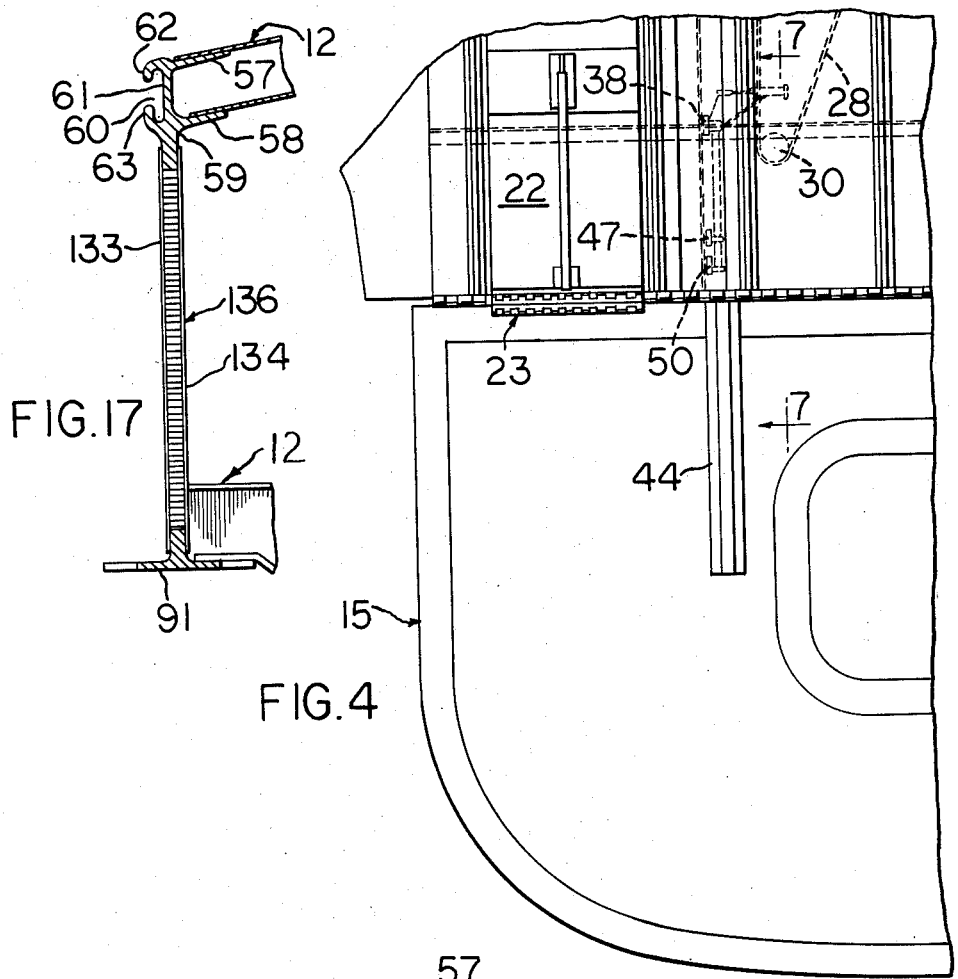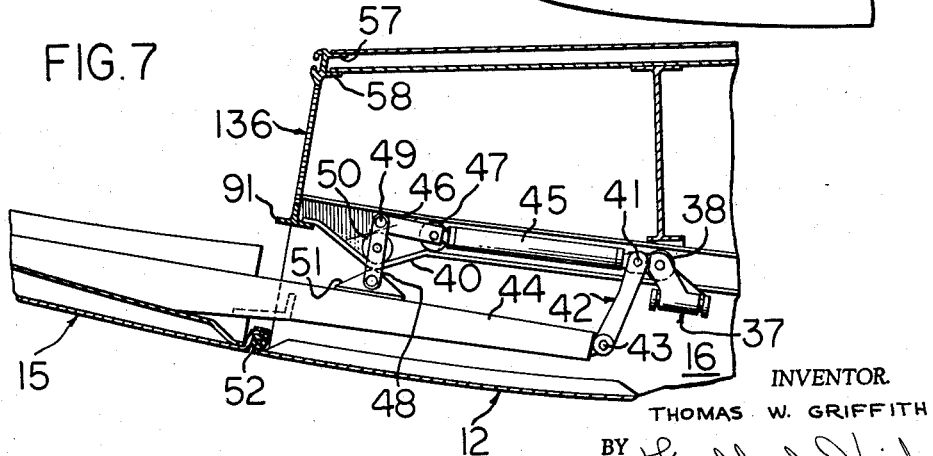

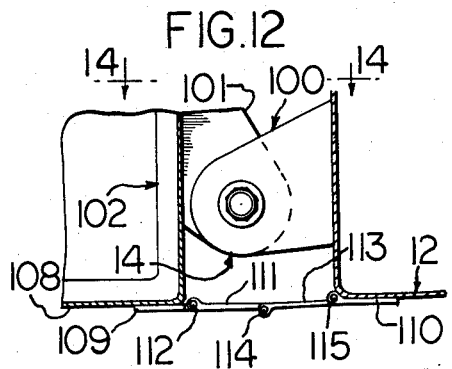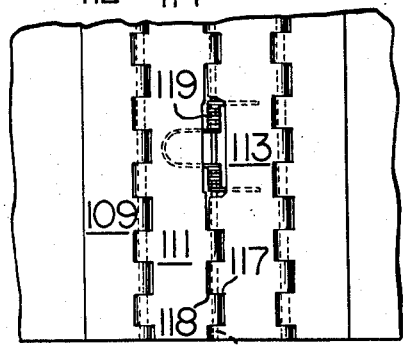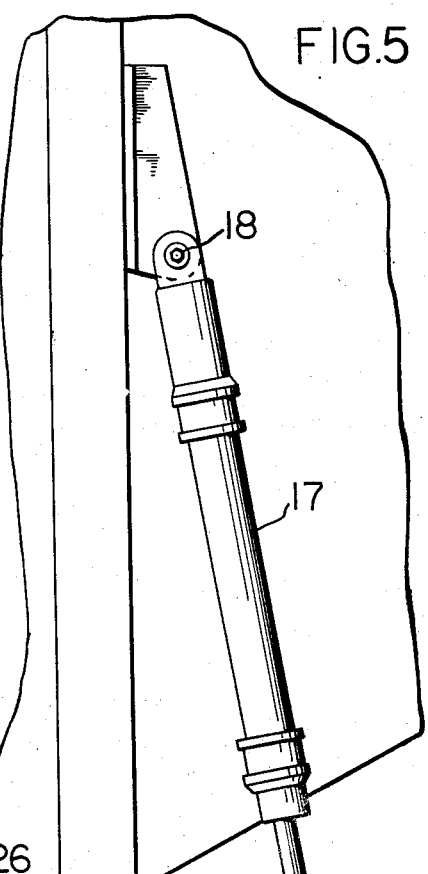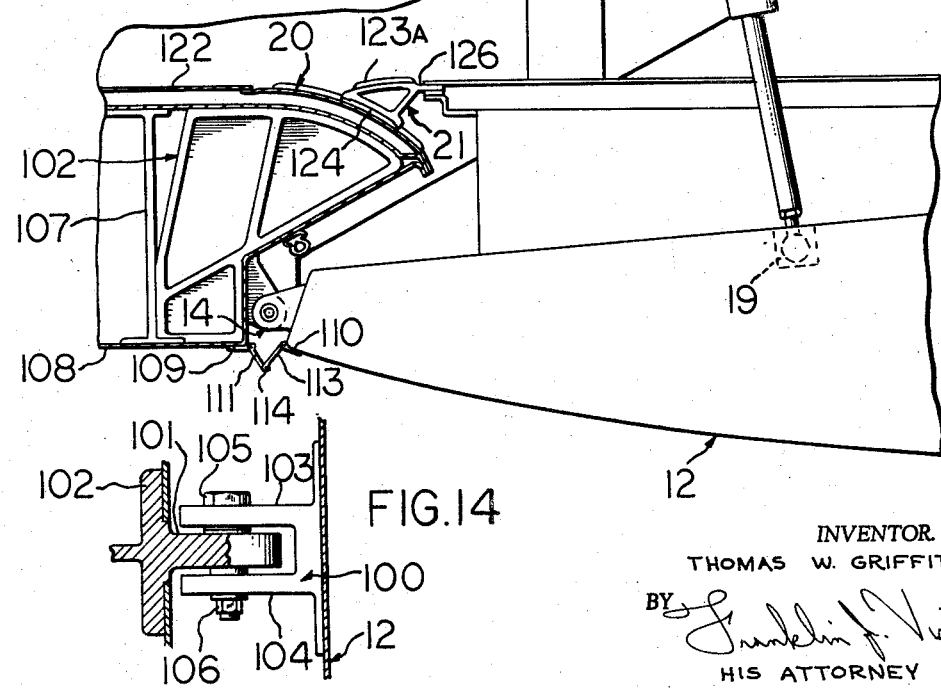

Sept. 8, 1964 T. W. GRIFFITH 3,147,942
CLOSURE AND LOADING DEVICE
Filed June 6, 1963 8 Sheets-Sheet 5
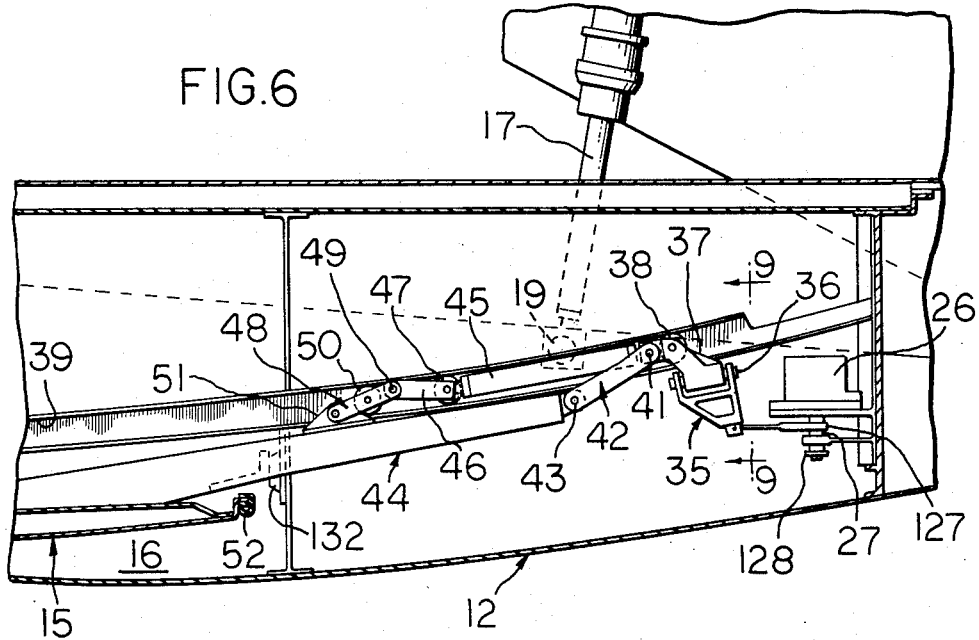
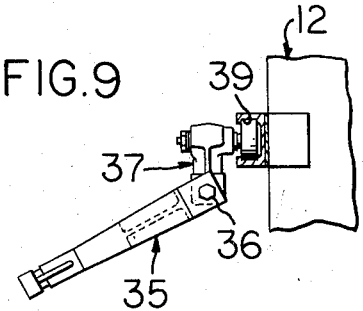
INVENTOR.
THOMAS W. GRIFFITH
BY
HIS ATTORNEY Sept. 8, 1964 T. W. GRIFFITH 3,147,942
CLOSURE AND LOADING DEVICE
Filed June 6, 1963 8 Sheets-Sheet 6

INVENTOR.
THOMAS W. GRIFFITH
BY
HIS ATTORNEY

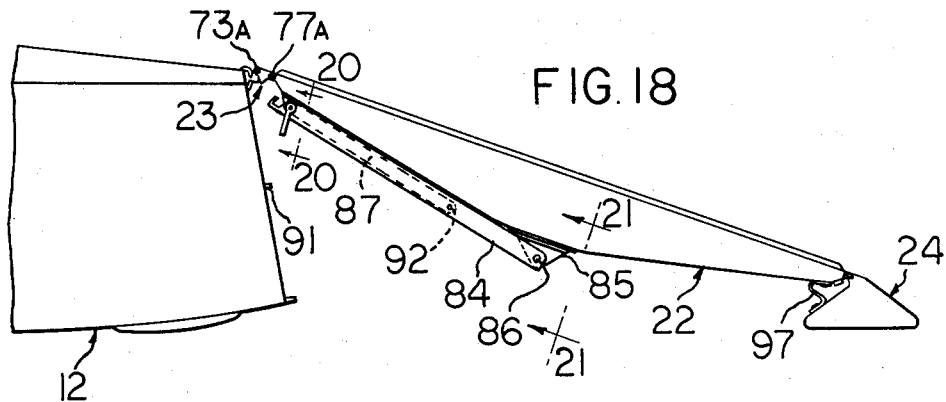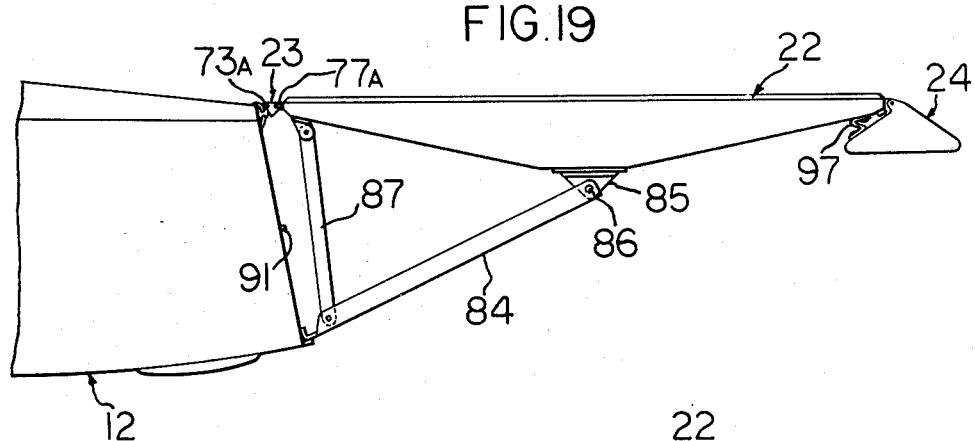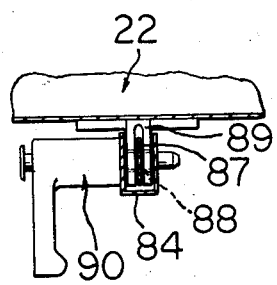

Sept. 8, 1964  T. W. GRIFFITH  3,147,942
CLOSURE AND LOADING DEVICE
Filed June 6, 1963  8 Sheets-Sheet 8
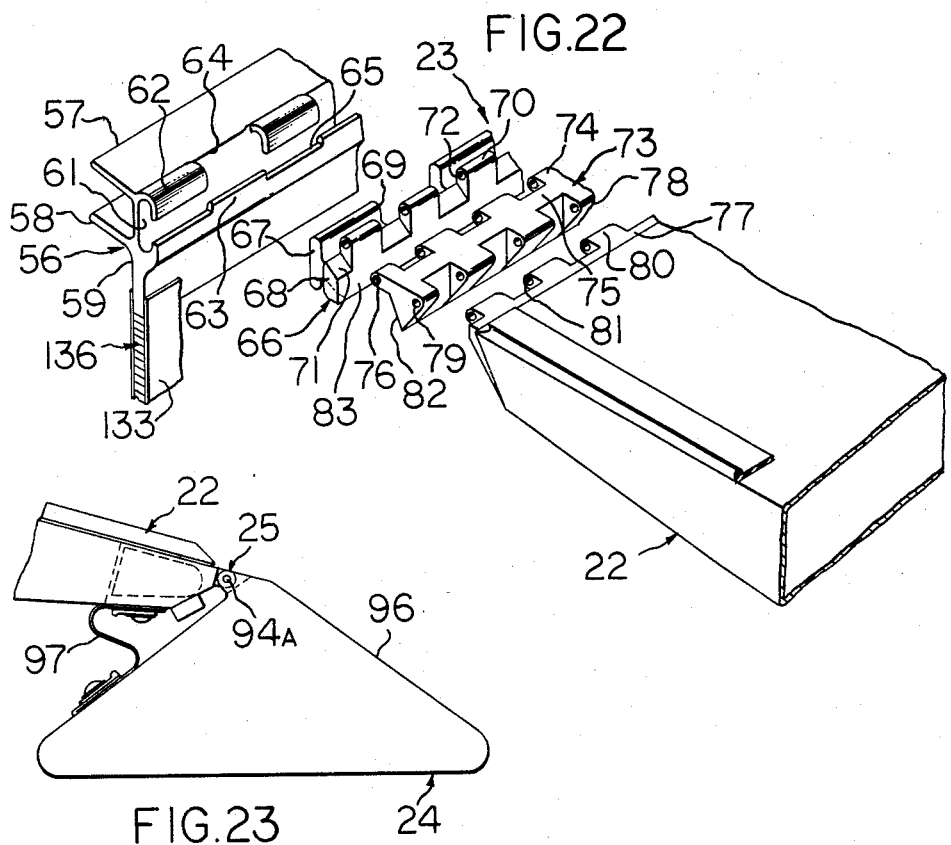
INVENTOR.
THOMAS W. GRIFFITH
BY
HIS ATTORNEY

United States Patent Office 3,147,942
Patented Sept. 8, 1964

3,147,942
CLOSURE AND LOADING DEVICE
Thomas W. Griffith, Horsham, Pa., assignor to The Boeing Company, Seattle, Wash., a corporation of Delaware
Filed June 6, 1963, Ser. No. 286,039
18 Claims. (Cl. 244—137)

This invention relates to a cargo-carrying compartment and, more particularly, to a unitary closure and loading device for use with the cargo-carrying compartment of an aircraft fuselage.

In cargo-carrying aircraft, the fuselage must be provided with an opening, preferably of the same size as the cargo-carrying compartment, in order that objects of substantially the same size as the compartment may be loaded and unloaded. This opening is preferably closed during operation of the aircraft in order to reduce aerodynamic disturbance of the aircraft.

Furthermore, aircraft of this type are capable of carrying equipment that is longer than the fuselage of the aircraft and extends rearwardly therefrom. However, the particular equipment that is longer may only fill a portion of the compartment such as the top third, for example. Therefore, it is desirable to reduce the size of the opening in the fuselage when the aircraft is in flight if equipment longer than the compartment is being carried therein.

Various types of closures have been employed previously but most of them have required the use of space within the fuselage above the opening for mounting of the structure to close at least a portion of the opening. Of course, this reduces the amount of cargo-carrying space.

The present invention satisfactorily solves these problems by providing a closure device in which the structure for closing the upper portion of the fuselage opening is carried within the device that closes the lower portion of the opening.

Another problem with cargo-carrying aircraft has been how to remove the cargo when the aircraft operates in an area where there are no specific loading and unloading facilities available. One method is for the aircraft to carry separate ramp means to provide for loading and unloading. However, this reduces the amount of cargo-carrying space. The present invention satisfactorily solves this problem by providing a closure device for the opening in the fuselage in which the device also functions as a loading and unloading ramp.

Additionally, when in an area where there are no loading and unloading facilities and since the floor surface of the aircraft loading and unloading ramp does not reach the ground, the present invention provides a satisfactory solution by employing an auxiliary ramp structure carried by the closure device.

In operations of the foregoing type wherein there are no specific loading and unloading facilities, the various vehicles, which may be used for unloading and loading purposes, will have various tread widths. The present invention employs a novel hinge structure that permits quick lateral adjustment of the auxiliary ramp structure to fit any tread width.

Accordingly, an object of this invention is to provide a unitary device for closing an opening in an aircraft structure in which the device also functions as a loading and unloading platform.

Another object of this invention is to provide a unitary ramp structure for closing an opening in an aircraft fuselage in which the structure for closing the opening includes auxiliary loading and unloading means that is stored on the unitary ramp structure.

A further object of this invention is to provide a ramp structure having auxiliary ramp means that may be easily adjusted to adapt to various size cargos, which are being loaded or unloaded, whenever the floor surface of the ramp structure is not at the same level as the surface to which the cargo is being loaded or unloaded.

Still another object of this invention is to provide a ramp structure having auxiliary means that may be quickly removed when not required for loading and unloading purposes.

An additional object of this invention is to provide a closure device for an aircraft fuselage opening whereby the closure device may be left open or partially open during flight to accommodate loads that are larger than the interior of the cargo-carrying space of the fuselage.

Other objects of this invention will be readily perceived from the following description, drawings, and claims.

This invention relates to a closure and loading device for closing an opening in a cargo-carrying compartment and for functioning as a cargo loading and unloading means from the compartment when in its open position. The device includes a ramp for closing a portion of the opening with the ramp having extensible means for closing the remainder of the opening. Auxiliary ramp means is stored on the ramp and forms an extension of the ramp when both the ramp and the auxiliary means are in their loading and unloading positions. The auxiliary ramp means is pivotally connected to the ramp by a hinge. The hinge includes means to permit lateral adjustment of the auxiliary ramp means with respect to the ramp.

This invention also relates to a closure and loading device for closing an opening in a cargo-carrying compartment and for functioning as a cargo loading and unloading means from the compartment when in its open position. The device includes a loading ramp for closing a portion of the opening with the ramp having extensible means for closing the remainder of the opening. The extensible means is moved from its stored position within the ramp to its closed position by suitable means.

This invention further relates to means for attaching a first member to a second member. The attaching means includes a first portion having a receptacle and a second portion having protrusions with slots formed therebetween. The protrusions are adapted for insertion into an opening in the receptacle for connecting the two portions together. The first portion of the attaching means has two sets of ears with slots formed therebetween. The sets of ears are disposed adjacent the opening in the receptacle. The ears of the two sets, the protrusions of the second portion, the slots of the first portion, and the slots of the second portion are of the same width. The slots between the ears of one set are opposite the ears of the other set whereby the protrusions of the second portion may be readily inserted within the slots of one of the sets and then moved laterally to form a unitary connection. The second portion is adapted to be pivotally connected by suitable means to one of the members and the first portion is adapted to be secured to the other of the members.

The attached drawings illustrate a preferred embodiment of the invention, in which—

FIGURE 1 is a perspective view of a portion of a helicopter including the closure and loading device of the present invention in its closed position;

FIGURE 2 is a perspective view of a portion of a helicopter including the ramp of the present invention in its loading and unloading position;

FIGURE 3 is a top plan view of a portion of the ramp with the cargo door and the auxiliary ramp means in their stored positions;

FIGURE 4 is a top plan view of a portion of the ramp with the cargo door in its extended position and the auxiliary ramp means in its stored position;

FIGURE 5 is a side elevation view of a portion of the ramp and its actuating mechanism;

FIGURE 6 is a sectional view taken along the line 6—6 of FIGURE 3 showing a portion of the ramp and cargo door and the actuating mechanism for the cargo door of the present invention with the cargo door in its retracted position;

FIGURE 7 is a sectional view similar to FIGURE 6 but with the cargo door in its extended position and taken along the line 7—7 of FIGURE 4;

FIGURE 9 is a sectional view taken along the line 9—9 of FIGURE 6;

FIGURE 10 is an enlarged sectional view of the transition structure between the cargo compartment floor and the ramp floor;

FIGURE 11 is a sectional view taken along the line 11—11 of FIGURE 10;

FIGURE 12 is an enlarged sectional view of a portion of the structure of FIGURE 5 with the ramp in its closed position;

FIGURE 13 is a bottom plan view of the structure of FIGURE 12;

FIGURE 14 is a sectional view taken along the line 14—14 of FIGURE 12;

FIGURE 15 is a sectional view taken along the line 15—15 of FIGURE 1;

FIGURE 16 is a sectional view taken along the line 16—16 of FIGURE 1;

FIGURE 17 is a sectional view of a portion of the end of the ramp;

FIGURE 18 is a side elevational view of the auxiliary ramp structure of the present invention in its loading and unloading position;

FIGURE 19 is a side elevational view of the auxiliary ramp structure in a substantially horizontal position for use as a work platform to provide access to mechanical portions of the aircraft;

FIGURE 20 is a sectional view taken along the line 20—20 of FIGURE 18;

FIGURE 21 is a sectional view taken along the line 21—21 of FIGURE 18;

FIGURE 22 is an exploded view of the hinge structure connecting the bridge of the auxiliary ramp structure to the ramp;

FIGURE 23 is a side elevational view of the connection of the pad of the auxiliary ramp structure to the bridge; and FIGURE 24 is a top plan view of the structure of FIGURE 23.

Figure 8:
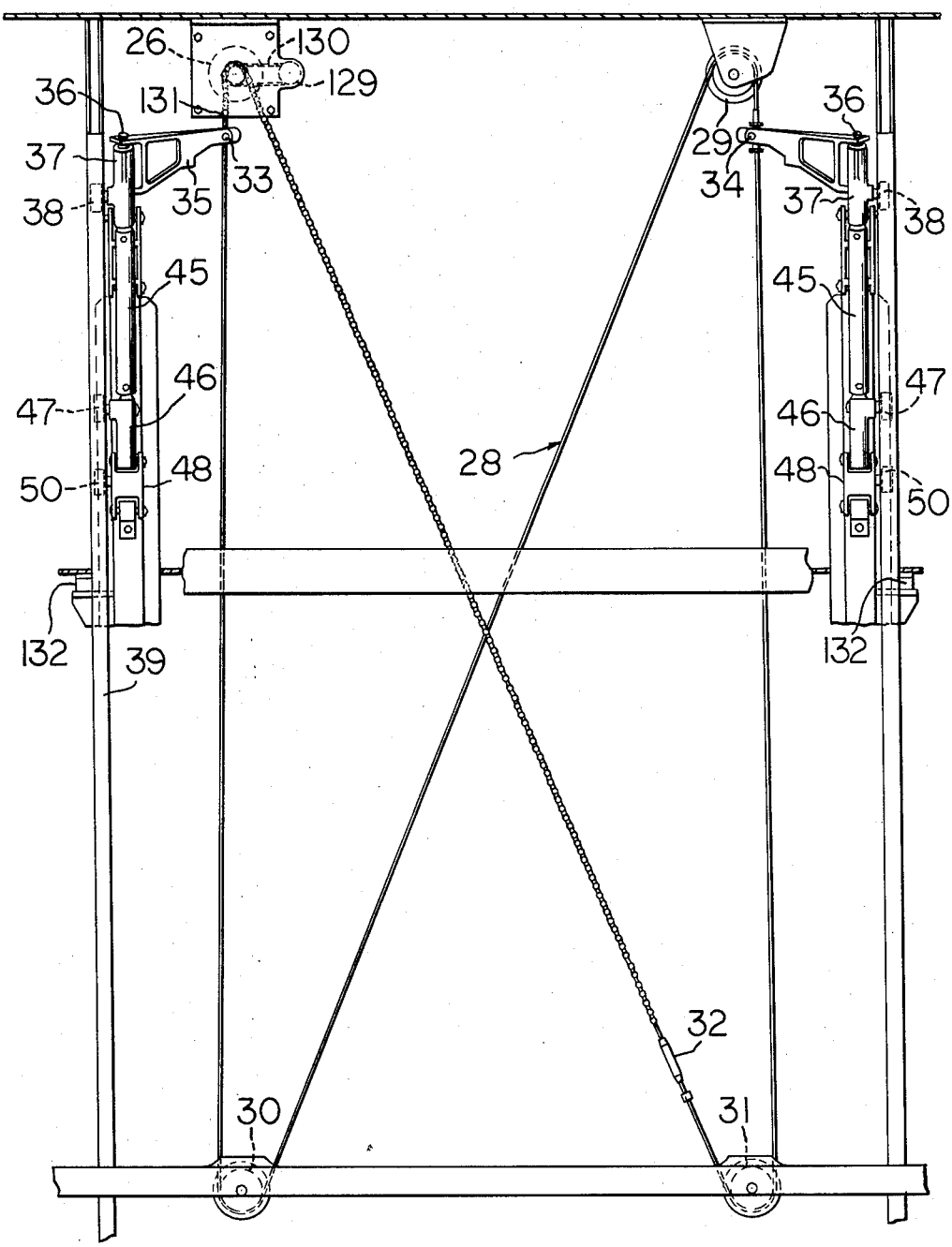
FIGURE 8 is a top plan view of the actuating mechanism for the extensible cargo door.

Referring to the drawings and particularly FIGURES 1 and 2, there is shown a fuselage 10 of an aircraft such as a helicopter. The fuselage 10 has a cargo-carrying compartment with an opening 11. The opening 11 is closed by a closure and loading device including a ramp 12, which is pivotally mounted on the fuselage 10 through a plurality of hinge connections 14 (see FIGURE 5). The closure and loading device also includes an extensible cargo door 15, which is movable from within the interior of the ramp 12.

As shown in FIGURE 14, each of the hinge connections 14 includes a bifurcated or clevis type member 100, which is preferably formed integral with the ramp 12. An extension 101 of a bracket member 102 is disposed between arms 103 and 104 of the member 100. The extension 101 and the arms 103 and 104 have bores extending therethrough for insertion of a bolt 105 to pivotally join the bracket member 102 to the bifurcated member 100. The bolt 105 is held in position by a nut 106.

As shown in FIGURE 5, the bracket member 102 is joined to a beam 107, wihch is a part of the fuselage 10, by suitable mechanical means. Thus, each of the hinge connections 14 provides pivotal mounting of the ramp 12 on the fuselage 10.

In order to provide a smooth aerodynamic configuration between the end of the bottom 108 (see FIGURE 12) of the fuselage 10 and the end of the bottom of the ramp 12, the space therebetween is connected by a hinged structure. This permits the relative movement of the ramp 12 with respect to the fuselage 10 while still providing a clean aerodynamic surface when the ramp 12 is in its closed position.

The hinged structure includes a first member 109, which is fixed to the bottom 108 of the fuselage 10, and a second member 110, which is fixed to the bottom of the ramp 12. A third member 111 is pivotally connected to the first member by a hinge connection 112 and to a fourth member 113 by a hinge connection 114. The other end of the fourth member 113 is pivotally connected by a hinge connection 115 to the second member 110. The hinged structure is shown in FIGURE 12 when the ramp 12 is in its closed position and in FIGURE 5 when the ramp 12 is in its loading and unloading position.

Each of the hinge connections 112, 114, and 115 is formed by passing a pin 116 through ears 117 and 118 on adjoining members (see FIGURE 13). A spring 119 is passed around the pin 116 and cooperates with the adjoining members to always urge the hinged structure to the position of FIGURE 12.

As shown in FIGURE 6, the ramp 12 has a receptacle or passage 16 for receiving the cargo door 15 when the door 15 is in its stored position within the ramp 12. The door 15 is moved from its stored position to its extended position by suitable mechanism, which also is mounted within the ramp 12.

The ramp 12 is moved from its closed position to its loading and unloading position by rotation about its hinge connection 14. The ramp 12 is rotated by a pair of hydraulic actuators 17, which are pivotally mounted at 18 to the fuselage 10 and at 19 to the ramp 12 (see FIGURE 5). FIGURE 3 illustrates that the connection of the hydraulic actuators 17 to the ramp 12 at 19 is outboard of the bifurcated members 100, which are parts of the hinge connections 14. One of the hydraulic actuators 17 is disposed on each side of the ramp 12.

In order to provide a smooth transition from the floor of the cargo-carrying compartment within the fuselage 10 the ramp floor when the ramp 12 is in its unloading and loading position, a pair of cooperating members 20 and 21 is utilized (see FIGURE 5). The arcuate member 20 is secured to the bracket member 102 of the fuselage 10 by suitable means (not shown) such as bolt and nut means. The arcuate member 20 forms a continuation of floor 122 of the fuselage 10.

As illustrated in FIGURES 5, 10, and 11, the member 20 has a plurality of spaced skid strips 123 (one shown) on its exterior surface for aiding in cargo loading. These skid strips cooperate with skid strips (not illustrated) on the floor 122 of the aircraft, skid strips 123A on the transition member 21, and skid strips (not illustrated) on the ramp 12. The skid strips 123 interfit with similar spaced recesses 124A in bearing pads 124 and an arcuate mounting portion 125 of the transition member 21, which is mounted on the ramp 12 (see FIGURE 5). In this manner, the skid strips 123 and bearing pads 124 cooperate to permit the member 21 to slide with respect to the member 20 when the ramp 12 pivots about its hinge connection 14. The skid strips 123 and bearing pads 124 are secured to the members 20 and 21, respectively, by suitable means (not shown) such as rivets, for example.

The transition member 21 is secured by a portion 126 to the ramp 12 by suitable means (not shown) such as bolts and nuts, for example. Thus, the member 21 moves with the ramp 12.

In addition to the cargo door 15, the ramp 12 also carries an auxiliary ramp structure including a pair of bridges 22. However, it should be understood that the number and width of the bridges employed may be varied as desired. As shown in FIGURE 2, each of the bridges 22 is of substantially less width than the width of the ramp 12. The bridges 22 are pivotally connected to the ramp 12 by a hinge 23 at the end remote from the ramp's connection to the fuselage 10. The end of the bridge 22 remote from its connection to the ramp 12 has a pad 24 pivotally connected thereto by a hinge 25 (see FIGURES 2 and 23).

In its stored position (see FIGURE 2), the auxiliary ramp structure rests upon the floor of the ramp 12. When the ramp 12 is in its loading and unloading position (see FIGURE 18), the bridges 22 are pivoted about the hinge 23 to provide a relatively smooth continuation of the floor of the ramp 12 to the ground. The pads 24 function to provide support for the auxiliary ramp, reduce bearing pressures at the end of the ramp, protect the ends of the ramp from vehicle pounding, and allow for uneven terrain.

The mechanism for moving the cargo door 15 from its stored position within the ramp 12 to its extended position to close the remainder of the opening 11, which is not closed by the ramp 12, is shown in FIGURES 3, 4, and 6–9. The mechanism includes a driving motor 26, which is preferably a hydraulic motor, having an output shaft 27. The output shaft 27 drives a roller chain-cable assembly 28, which also passes around three pulleys 29, 30, and 31 mounted within the ramp 12 (see FIGURE 8). The roller chain-cable assembly 28 is maintained with the desired tension through an adjustable turnbuckle 32.

The output shaft 27 has a pair of sprockets 127 and 128 (see FIGURE 6) mounted thereon. The sprocket 127 meshes with a chain portion of the roller chain-cable assembly 28 to drive the assembly 28. As shown in FIGURE 8, the chain portion of the assembly 28 extends from point 131 to the turnbuckle 32. The remainder of the assembly 28 is cable. The sprocket 128 is connected to a shaft 129 by a chain 130 (see FIGURE 8). The shaft 129 may be actuated through a crank (not shown) to drive the roller chain-cable assembly 28 if the motor 26 fails.

The roller chain-cable assembly 28 is fixedly connected at 33 and 34 to identical linkage mechanisms, which are attached to opposite sides of the cargo door 15. Since the linkage mechanisms are identical, only one will be described in detail. Considering the linkage mechanism, which is connected to the roller chain-cable assembly 28 at 33, there is shown a link 35 fixedly connected at 33 to the roller chain-cable assembly 28. The link 35 is pivotally connected through a bolt 36 or the like to a roller member 37. The roller member 37 has a roller 38 riding in a track 39, which is supported by the ramp 12. The track 39, which is channel-shaped (see FIGURE 9), terminates in a dip 40 (see FIGURE 7) at its outermost end.

The roller member 37 is pivotally connected by a bolt 41 or the like to a link 42, which has its other end pivotally connected by a bolt 43 or the like to a support 44. The support 44 is secured to the cargo door 15 and forms a unitary portion thereof.

The roller member 37 is connected through a rod 45 to a second roller member 46 having a roller 47 riding in the track 39. The second roller member 46 is pivotally connected to a third roller member 48 by a bolt 49 or the like. The third roller member 48 has a roller 50, which also rides in the track 39. The end of the third roller member 48, which is remote from its connection to the second roller member 46, is pivotally connected through an attachment member 51 to the support 44.

If the linkage mechanisms, which connect the chain-cable assembly 28 to the cargo door 15, are in the position shown in FIGURE 8, it is seen that counter-clockwise rotation of the output shaft 27 of the motor 26, as viewed in FIGURE 8, will result in advancing the cargo door 15 from its stored position within the passage 16 of the ramp 12. The motor 26 continues to advance the door 15 from within its confines of the ramp 12 through the linkage mechanisms until the roller 50 reaches the dip or cam portion 40 of the track 39.

When the roller 50 reaches the dip 40, further advancement of the cargo door 15 from the ramp 12 is prevented. However, the downward movement of the roller 50 along the dip 40 results in the member 48 rotating counter-clockwise, as viewed in FIGURE 7, to move the support 44 downward and thereby the cargo door 15 into engagement at its inner end with the outer end of the ramp 12. The relation of the cargo door 15 with the ramp 12 when the cargo door 15 has been moved into contact with the ramp 12 is disclosed in FIGURE 7. It will be observed that a seal 52 (see FIGURE 16), which is carried by the cargo door 15, cooperates between the structure of the ramp 12 and the cargo door 15 to seal this part of the opening 11.

When the outward movement of the door 15 is limited by the dip or cam portion 40 of the track 39, the counter-clockwise rotation in FIGURE 7 of the third roller member 48 results in the link 42 moving counter-clockwise about its pivot connection 41 with the roller member 37. This rotation of the link 42 is simultaneous with the movement of the third roller member 48 due to the roller 50 moving downwardly into the dip or cam portion 40.

If the output shaft 27 of the motor 26 is rotated clockwise, as viewed in FIGURE 8, the exact opposite operation will occur. Thus, the roller 50 will first advance upwardly along the cam or dip portion 40 to rotate the roller member 48 and the link 42 clockwise, as viewed in FIGURE 7, and elevate the cargo door 15 away from the ramp 12. This permits the cargo door 15 to then be retracted within the confines of the receptacle or passage 16 in the ramp 12. The retraction of the door 15 within the confines of the receptacle 16 is limited by engagement of a portion of the support 44 of the door 15 with a resilient bumper 132 (see FIGURE 6), which is mounted on the ramp 12.

When the cargo door 15 is disposed in its extended position, the portion of the door 15 that is in contact with the fuselage 10 has a seal 53 disposed thereon (see FIGURE 15). Thus, the seals 52 and 53 provide a complete sealing of the portion of the opening 11 that is not closed by the ramp 12.

The door 15 also has a plurality of spacers 54 mounted adjacent its upper edge on the interior thereof and a plurality of spacers 55 on its exterior (see FIGURES 2 and 15). The interior spacers 54 engage against interior structural members of the ramp 12 when the cargo door 15 is retracted within the confines of the receptacle 16 of the ramp 12. Similarly, the spacers 55 contact the outer skin of the ramp 12 when the cargo door 15 is retracted within the confiines of the passage 16 of the ramp 12. Accordingly, the spacers 54 and 55 act to insure that the ramp ground loads are transmitted directly to structural members. The spacers 55 also cooperate with the bumper 132 (see FIGURE 6) to insure that the cargo door 15 is fixedly held within the confines of the passage 16 of the ramp 12 when the cargo door 15 has been completely retracted.

The details of the hinge 23 are disclosed in FIGURES 17 and 22. As shown in FIGURE 22, the hinge 23 includes an extrusion 56, which is attached to the ramp 12 by arms 57 and 58. The arms 57 and 58 are secured to the ramp 12 by suitable means such as screws (not shown). A third arm 59 of the extrusion 56 serves as an upper beam cap of a honeycomb frame 136, which comprises a pair of side plates 133 and 134 (see FIGURE 17) bonded together with honeycomb therebetween. The arm 59 is held between the side plates 133 and 134 by bonding. A base member 91 serves as a bottom beam cap and also is bonded between the side plates 133 and 134 at the end opposite to the arm 59. This structural arrangement provides strength while being light weight. As shown in FIGURE 17, the lower part of the frame 136 is secured to the portion of the ramp 12 having the roller tracks 39.

The extrusion 56 includes a receptacle 60, which is C-shaped in cross section, with a rear wall 61. Opposite the rear wall 61, the receptacle 60 has an entrance or opening, which is guarded by lips or ears 62 and 63. These ears 62 and 63 form the terminal ends of the C-shaped receptacle 60. As clearly shown in FIGURE 22, the ears 62 are spaced from each other with slots 64 formed therebetween. Similarly, the ears 63 have slots 65 formed therebetween. The width of the ears 62, the ears 63, the slots 64, and the slots 65 are all the same; they are preferably one inch in width.

The hinge 23 also includes an idler hinge support 66 (see FIGURE 22). The support 66 has a plurality of spaced protrusions or ears 67 extending from a main body portion 68 of the support 66. These protrusions 67 have slots 69 formed therebetween. The slots 69 and the protrusions 67 are of the same width as the ears 62, 63 and the slots 64, 65 of the extrusion 56. Thus, the support 66 may be easily attached to the extrusion 56 by passing the protrusions 67 preferably through the set of slots 64 and then moving the support 66 laterally until each of the protrusions 67 is resting on the lowest surface of the receptacle 60 and is encompassed by and coextensive with the ears 62. The bottoms of the slots 65 are not coextensive with the lowest surface of the receptacle 60 but have a projecting root as shown in FIGURE 22. These roots serve to guide the protrusions 67 of the support 66 along the entire length of the receptacle 60. Accordingly, the two parts are quickly connected together and the support 66 may be easily moved for lateral adjustment of the support 66 with respect to the extrusion 56.

The support 66 has a second set of ears 70 extending upwardly from the center body 68. Each of the ears 70 has a bore 72 extending therethrough with the bores in alignment with each other. An idler hinge 73 is connected to the support 66 through ears 74, which extend from a center body 75 of the idler hinge 73. The ears 74 have bores 76 extending therethrough in alignment with each other. The idler hinge 73 is secured to the idler hinge support 66 by means of a pin 73A (see FIGURE 18) passing through the bores 76 of the ears 74 and the bores 72 of the ears 70. The pin 73A is staked in position by depressing one of the sets of the ears 70 or 74 against the pin 73A. It will be observed that the ears 70 are spaced from each other to permit the insertion of the ears 74 therebetween. Note that the slots in the center body 68 of the support 66 have a slanting surface 71 to permit the ears 74 to freely rotate with respect to the support 66.

The idler hinge 73 also is attached to a hinge member 77. The idler hinge 73 has a second set of ears 78 extending from the center body 75 with bores 79 therein. As shown in FIGURE 22, the ears 78 are opposite the ears 74. The hinge member 77 has ears 80 with bores 81 extending therethrough for cooperation with the ears 78 and their bores 79. A pin 77A (see FIGURE 18) is passed through the bores 79 and 81 to form a unitary pivotal connection between the hinge member 77 and the idler hinge 73. The pin 77A also is staked in position by depressing one of the sets of the ears 78 or 80 against the pin 77A. One of the hinge members 77 is secured to each of the bridges 22 of the auxiliary ramp structures, as shown in FIGURE 22, by suitable means such as welding, for example.

From the foregoing description, it is readily seen that each of the bridges 22 may be easily adjusted laterally with respect to the ramp 12, which is attached to the extrusion 56. This is accomplished by inserting the protrusions 67 preferably into the set of slots 64 and then moving the bridge 22 until the protrusions 67 are disposed in the ears 62, 63. By making the widths of the ears 62, 63, the slots 64, 65, the protrusions 67, and the slots 69 the same, such as one inch for example, it is seen that the bridges 22 may be moved laterally in one inch increments or in multiples thereof. It should be observed that the protrusions 67 may be moved laterally within the receptacle 60 by lifting the weight of the bridge 22 and thereby avoiding, as the bridge is moved laterally, engagement with the step formed between the terminal end of the ears 63 and the root surface of the slots 65. Thus, for lateral adjustment, it is not necessary to remove the protrusions 67 from the receptacle 60 once they have been inserted.

When each of the bridges 22 is rotated from its stored position, it pivots freely until a surface 82 of the center body 75 of the idler hinge 73 engages against a stop surface 83 of the center body 68 of the idler hinge 66. The surface 82 is designed so as to insure that the floor of the bridge 22 forms a smooth continuation of the floor of the ramp 12 when the bridge 22 is in its loading and unloading position. The slanted surface 71 of the slots of the center body 68 of the idler hinge support 66 permits the free rotation of the idler hinge 73 from the bridge's stored position to the bridge's loading and unloading position.

It should be understood that the hinge support 66 could be formed with the C-shaped receptacle 60 and the extrusion 56 could have the protrusions 67. Furthermore, if desired, the rear wall 61 of the receptacle 60 could be eliminated since the center body 68 of the idler hinge support 66 would limit rearward movement of the idler hinge support 66 into the receptacle 60.

Both the ramp 12 and the bridges 22 may be employed as work platforms. While the ramp 12 may be positioned horizontally to form a level work platform through the actuators 17, the bridges 22 require specific support to maintain them substantially horizontal so that they may be used as work platforms for one working on the lower portion of the helicopter's aft pylon.

Accordingly, as shown in FIGURES 18 and 19, at least one of the bridges has a support assembly including a brace 84, which is pivotally connected to a bracket 85 on the underside of the bridge 22 by suitable means such as a bolt 86 or the like. As shown in FIGURE 21, the brace 84 is formed of a U-shaped channel.

A second brace 87 of the support assembly is pivotally connected through a bushing 88, which passes through a bore in the brace 87 and through bores in a bifurcated member 89. The second brace 87 is disposed within the U-shaped channel of the brace 84 when the support assembly is in its stored position, as shown in FIGURE 18. The brace 84 is held in its stored position by a pin 90, which passes through bores in the two sides of the U-shaped channel of the brace 84 and through the bushing 88. In this manner, the support assembly is held in its stored position.

When it is desired to support the bridge 22 in a substantially horizontal position so that it may function as a work platform, the pin 90 is withdrawn from the bores in the brace 84 to permit the brace 84 to pivot downwardly about its connection 86. As illustrated in FIGURE 19, the brace 84 is supported on the skin of the ramp 12, which has sufficient thickness and strength to provide support when used as a work platform. The second brace 87 has a bore 92 remote from its connection to the bridge 22. This bore 92 aligns with the bores in the wall of the brace 84 whereby the pin 90 may be passed through these bores to lock the braces 84 and 87 in their support position. This relationship is shown in FIGURE 19.

Since the thickness of the ramp 12 prevents direct entry of a vehicle, the bridge 22 functions to provide a relatively smooth continuation from the floor of the ramp 12 toward the ground. The pad 24 is mounted on the bridge 22 by the hinge 25 at the end of the bridge remote from its connection to the ramp to avoid damage to the relatively thin bridge end and provide a firm support. The hinge 25 includes a hinge member 94, which is identical to the hinge member 77, on the bridge 22 having ears 93 for cooperation with a plurality of ears 95 on the pad 24. The ears 95 have aligned bores that cooperate with bores in the ears 93 of the hinge member 94 to permit a pin 94A to be passed through these bores to provide the pivotal connection therebetween. The pin 94A is staked in position by depressing either the set of ears 95 or the set of ears 93 in the member 94 against the pin 94A. It should be understood that the ears 95 have slots therebetween in the same manner that the ears 93 of the hinge member 94 so that the ears of one member fit within the slots of the other member.

When the auxiliary ramp structure is rotated from its loading and unloading position toward its stored position, the pad 24 tends to rotate about the pin 94A so that surface 96 of the pad 24 tends to travel beyond a position parallel with the floor of the bridge 22. If this were to occur, it would be difficult to compactly store the auxiliary ramp structure on the floor of the ramp 12 in the manner shown in FIGURE 2. Therefore, a strap member 97 is secured between the under surface of the bridge 22 and the pad 24 to prevent the surface 96 from going beyond a position parallel with the floor of the bridge 22. The strap member 97 should be made of a material that will be both flexible and durable such as nylon, for example.

Considering the operation of the present invention, it will be assumed that the opening 11 in the fuselage 10 is closed by the ramp 12 and the cargo door 15. The hydraulic actuators 17 are first actuated to rotate the ramp 12 about its hinge connections 14. When the ramp 12 has moved partially away from the opening 11, the rotation of the ramp 12 is stopped and the motor 26 is energized. This results in the cargo door 15 beiny retracted within the receptacle 16 of the ramp 12. After the cargo door 15 is completely retracted, the ramp 12 is then rotated to its loading and unloading position by the hydraulic actuators 17.

After the ramp 12 has reached its loading and unloading position, the bridges 22 are then rotated about the hinge 23 to form a smooth continuation of the ramp 12. After the bridges 22 have reached their desired loading and unloading position, the pads 24 are moved about their hinges 25 to form the continuation of their respective bridges 22. The distance between the bridges 22 may be easily adjusted by sliding the protrusions 67 of the idler hinge support 66 of either or both of the bridges 22 in the receptacle 60 of the extrusion 56 on the ramp 12.

In closing the opening 11, the reverse procedure is employed. However, if it is desired to leave the upper portion of the opening 11 open, then the cargo door 15 is not extended. This is accomplished by not energizing the motor 26 but continuing the energization of the hydraulic actuators 17 until the ramp 12 reaches its closed position.

An advantage of this invention is that the space in the fuselage above the opening is available for other uses. Another advantage of this invention is that it provides a maximum clearance for cargo loading. A further advantage of the present invention is that the ramp structure utilizes a minimum amount of space. An additional advantage of this invention is that the auxiliary ramp hinge structure permits an infinitely adjustable positive lateral positioning of the auxiliary ramp structure. The hinge structure also allows quick installation or removal of the auxiliary ramp structure. Still another advantage of the present invention is that the ramp structure creates a minimum aerodynamic disturbance when it is in its open position during the flight of the aircraft.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A closure and loading device for closing an opening in a cargo-carrying compartment and for functioning as a cargo loading and unloading means from the compartment when in its open position, said device including a ramp for closing a portion of the opening, said ramp having extensible means for closing the remainder of the opening, auxiliary ramp means stored on the ramp and forming an extension of the ramp when both the ramp and the auxiliary ramp means are in their loading and unloading positions, and a hinge pivotally connecting said auxiliary ramp means to said ramp, said hinge including means to permit lateral adjustment of said auxiliary ramp means with respect to said ramp.

2. A closure and loading device for closing an opening in a cargo-carrying compartment and for functioning as a cargo loading and unloading means from the compartment when in its open position, said device including a ramp for closing a portion of the opening, said ramp having extensible means for closing the remainder of the opening, auxiliary ramp means stored on the ramp and forming an extension of the ramp when both the ramp and the auxiliary ramp means are in their loading and unloading positions, and hinge means pivotally connecting said auxiliary ramp means to said ramp, said hinge means including a first member having a receptacle including two sets of ears with slots therebetween, said two sets of ears being staggered with respect to each other whereby the ear of one set is opposite a slot formed between the ears of the other set, a second member including ears and slots of the same width as the ears and slots of the first member, one of said members being secured to the ramp and the other of said members being pivotally connected to said auxiliary ramp means, the ears of said second member being disposed in the receptacle of said first member to permit lateral adjustment of said auxiliary ramp means with respect to said ramp.

3. A closure and loading device for closing an opening in a cargo-carrying compartment and for functioning as a cargo loading and unloading means from the compartment when in its open position, said device including a ramp for closing a portion of the opening, said ramp having extensible means for closing the remainder of the opening, auxiliary ramp means stored on the ramp and forming an extension of the ramp when both the ramp and the auxiliary ramp means are in their loading and unloading positions, and hinge means pivotally connecting said auxiliary ramp means to said ramp, said hinge means including a first member having a receptacle including two sets of ears with slots therebetween, said two sets of ears being staggered with respect to each other whereby the ear of one set is opposite a slot formed between the ears of the other set, a second member including ears and slots of the same width as the ears and slots of the first member, one of said members being secured to the ramp and the other of said members being pivotally connected to said auxiliary ramp means, the ears of said second member being disposed in the receptacle of said first member to permit lateral adjustment of said auxiliary ramp means with respect to said ramp, said pivotally connected member of said hinge means having means to position said auxiliary ramp means to provide a smooth continuation of said ramp when said ramp and said auxiliary ramp means are in their loading and unloading positions.

4. A closure and loading device for closing an opening in a cargo-carrying compartment and for functioning as a cargo loading and unloading means from the compartment when in its open position, said device including a ramp for closing a portion of the opening, means for moving said ramp from its closed position to its open position, said ramp having extensible means for closing the remainder of the opening, means for moving the extensible means from a stored position within the ramp to its closed position, auxiliary ramp means stored on the ramp and forming an extension of the ramp when both the ramp and the auxiliary ramp means are in their loading and unloading positions, and a hinge pivotally connecting said auxiliary ramp means to said ramp, said hinge including means to permit lateral adjustment of said auxiliary ramp means with respect to said ramp.

5. A closure and loading device for closing an opening in a cargo-carrying compartment and for functioning as a cargo loading and unloading means from the compartment when in its open position, said device including a pivotally mounted ramp for closing a portion of the opening, means for moving said ramp from its closed position to its open position, said ramp having extensible means for closing the remainder of the opening, means for moving the extensible means from a stored position within the ramp to its closed position, auxiliary ramp means stored on the ramp and forming an extension of the ramp when both the ramp and the auxiliary ramp means are in their loading and unloading positions, and a hinge pivotally connecting said auxiliary ramp means to said ramp, said hinge including means to permit lateral adjustment of said auxiliary ramp means with respect to said ramp.

6. A closure and loading device for closing an opening in a cargo-carrying compartment and for functioning as a cargo loading and unloading means from the compartment when in its open position, said device including a ramp for closing a portion of the opening, said ramp having extensible means for closing the remainder of the opening, said extensible means having means for cooperation with the compartment and with the ramp to seal the remainder of the opening, auxiliary ramp means stored on the ramp and forming an extension of the ramp when both the ramp and the auxiliary ramp means are in their loading and unloading positions, and a hinge pivotally connecting said auxiliary ramp means to said ramp, said hinge including means to permit lateral adjustment of said auxiliary ramp means with respect to said ramp.

7. A closure and loading device for closing an opening in a cargo-carrying compartment and for functioning as a cargo loading and unloading means from the compartment when in its open position, said device including a ramp for closing a portion of the opening, said ramp having extensible means for closing the remainder of the opening, auxiliary ramp means stored on the ramp and forming an extension of the ramp when both the ramp and the auxiliary ramp means are in their loading and unloading positions, and a hinge pivotally connecting said auxiliary ramp means to said ramp, said hinge including means to permit lateral adjustment of said auxiliary ramp means with respect to said ramp, said hinge having means to position said auxiliary ramp means to provide a smooth continuation of said ramp when said ramp and said auxiliary ramp means are in their loading and unloading positions, and means to support the auxiliary ramp means in a substantially horizontal position.

8. A closure and loading device for closing an opening in a cargo-carrying compartment and for functioning as a cargo loading and unloading means from the compartment when in its open position, said device including a ramp for closing a portion for the opening, said ramp having extensible means for closing the remainder of the opening, auxiliary ramp means stored on the ramp and forming an extension of the ramp when both the ramp and the auxiliary ramp means are in their loading and unloading positions, said auxiliary ramp means including at least one bridge and one pad, and a hinge pivotally connecting said bridge to said ramp, said hinge having means to permit lateral adjustment of said bridge with respect to said ramp, said hinge having means to position said bridge to provide a smooth continuation of said ramp when said ramp and said bridge are in their loading and unloading positions, said pad being pivotally connected to said bridge at the end of the bridge remote from the ramp, and means to limit movement of said pad when the auxiliary ramp means is in its stored position.

9. A closure and loading device for closing an opening in a cargo-carrying compartment and for functioning as a cargo loading and unloading means from the compartment when in its open position, said device including a ramp for closing a portion of the opening, said ramp having extensible means for closing the remainder of the opening, auxiliary ramp means stored on the ramp and forming an extension of the ramp when both the ramp and the auxiliary ramp means are in their loading and unloading positions, said auxiliary ramp means including at least one bridge and one pad, and a hinge pivotally connecting said bridge to said ramp, said hinge having means to permit lateral adjustment of said bridge with respect to said ramp, said hinge having means to position said bridge to provide a smooth continuation of said ramp when said ramp and said bridge are in their loading and unloading positions, means to support the bridge in a substantially horizontal position, said support means including a first brace pivotally connected to said bridge adjacent the end nearest the ramp, a second brace pivotally connected to said bridge near its mid-point, means to maintain the braces in a stored position, and means to maintain the braces in their support position when the bridge is in the substantially horizontal position.

10. A closure and loading device for closing an opening in a cargo-carrying compartment and for functioning as a cargo loading and unloading means from the compartment when in its open position, said device including a loading ramp for closing a portion of the opening, said ramp having extensible means for closing the remainder of the opening, means for moving the extensible means from a stored position within the ramp to its closed position, said moving means for said extensible means including driving means mounted in the ramp, track means disposed in the ramp, linkage means connecting the driving means and the extensible means, a portion of said linkage means being disposed in said track means, said track means having means to limit the outward movement of said extensible means, said limit means cooperating with said linkage means to move said extensible means into engagement with said ramp when said extensible means is prevented by said limit means from further outward movement from said ramp by said driving means.

11. A closure and loading device for closing an opening in a cargo-carrying compartment and for functioning as a cargo loading and unloading means from the compartment when in its open position, said device including a loading ramp for closing a portion of the opening, said ramp having extensible means for closing the remainder of the opening, maens for moving the extensible means from a stored position within the ramp to its closed position, said moving means for said extensible means including driving means mounted in the ramp, track means disposed in the ramp, linkage means connecting the driving means and the extensible means, a portion of said linkage means being disposed in said track means, said track means having means to limit the outward movement of said extensible means, said limit means cooperating with said linkage means to move said extensible means into engagement with said ramp when said extensible means is prevented by said limit means from further outward movement from said ramp by said driving means, said extensible means having means for sealing the remainder of the opening when the extensible means is in its most extended position.

12. Means for attaching a first member to a second member including a first portion having a receptacle and a second portion having protrusions with slots formed therebetween dividing the protrusions into individual sections, said protrusion sections being adapted for insertion into an opening in said receptacle for connecting the two portions together, said receptacle of said first portion having two sets of ears with slots therebetween, said sets of ears being disposed adjacent said opening, the ears of said two sets, the protrusion sections of said second portion, the slots of the first portion, and the slots of the second portion being of the same approximate width, the slots between the ears of one set being opposite the ears of the other set whereby the protrusion sections of said second portion may be readily inserted within the slots of one of said sets and then moved laterally in either direction, without disengaging the protrusions from the ears of the receptacle, to form a unitary connection, means adapted to pivotally connect said second portion to one of the members, and the first portion adapted to be secured to the other of the members.

13. Means for attaching a first member to a second member including a first portion having a C-shaped receptacle with the terminal ends of said C-shaped receptacle being formed by two sets of ears with slots therebetween, said two sets of ears being staggered with respect to each other whereby the ear of one set is opposite a slot formed between the ears of the other set, a second portion including protrusions and slots of the same width as the ears and slots of the first portion, said slots dividing the protrusions into individual members, the protrusions of said second portion being adapted for insertion into the slots of one of the sets of the first portion whereby the second portion is moved laterally in either direction without disengaging the individual protrusion members from said ears, means adapted to pivotally connect said second portion to one of the members, and the first portion adapted to be secured to the other of the members.

14. A closure and loading device for closing an opening in an aircraft fuselage and for functioning as a cargo loading and unloading means from the fuselage when the aircraft is on the ground, said device including a ramp for closing a portion of the opening in the fuselage, said ramp having extensible means for closing the remainder of the opening in the fuselage, said ramp and said extensible means cooperating to form a streamlined continuation of the fuselage in their closed positions, auxiliarly ramp means of substantially smaller width than the ramp and stored on the ramp, said auxiliary ramp means forming an extension of the ramp when both the ramp and the auxiliary ramp means are in their loading and unloading positions, and a hinge pivotally connecting said auxiliary ramp means to said ramp, said hinge including means to permit lateral adjustment of said auxiliary ramp means with respect to said ramp, said hinge having means to position said auxiliary ramp means to provide a smooth continuation of said ramp to the ground when the ramp and the auxiliary ramp means are in their loading and unloading positions.

15. A closure and loading device for closing an opening in an aircraft fuselage and for functioning as a cargo loading and unloading means from the fuselage when the aircraft is on the ground, said device including a ramp for closing a portion of the opening, means pivotally mounting the ramp on the fuselage, means connected to the fuselage and the ramp for moving the ramp from its closed position to its open position, said ramp having extensible means for closing the remainder of the opening in the fuselage, means disposed within the ramp for moving the extensible means from a stored position within the ramp to its closed position, said ramp and said extensible means cooperating to form a streamlined continuation of the fuselage in their closed positions, and said extensible means having means for cooperation with the fuselage and the ramp to seal the remainder of the opening.

16. A closure and loading device for closing an opening in an aircraft fuselage and for functioning as a cargo loading and unloading means from the fuselage when the aircraft is on the ground, said device including a ramp for closing a portion of the opening, means pivotally mounting the ramp on the fuselage, means connected to the fuselage and the ramp for moving the ramp from its closed position to its open position, said ramp having extensible means for closing the remainder of the opening in the fuselage, means disposed within the ramp for moving the extensible means from a stored position within the ramp to its closed position, said ramp and said extensible means cooperating to form a streamlined continuation of the fuselage in their closed positions, said extensible means having means for cooperation with the fuselage and the ramp to seal the remainder of the opening, auxiliary ramp means stored on the ramp and forming an extension of the ramp when both the ramp and the auxiliary ramp means are in their loading and unloading positions, said auxiliary ramp means including at least one bridge of substantially lesser width than the ramp and at least one pad of substantially the same width as said bridge, and hinge means pivotally connecting said bridge to said ramp, said hinge means having means to permit lateral adjustment of said bridge with respect to said ramp, said pad being pivotally connected to said bridge at the end of the bridge remote from the ramp, and means to limit the movement of said pad when the auxiliary ramp means is in its stored position.

17. A hinge structure including a first member a second member, and a protrusion on said second member, said first member having means for receiving said protrusion of the second member, said receiving means including an entrance to accommodate said protrusion, said receiving means having oppositely disposed lip portions to guard the entrance, said lip portions having slots of the same width as the lips with the lip of one portion being disposed opposite the slot of the other portion, said protrusion being formed of a plurality of ears with slots therebetween isolating the ears with respect to one another, said ears and slots being of the same width as the slots and the lips of said first member whereby said second member may be laterally adjusted with respect to said first member, at least one of said members having means to limit the penetration of said second member into the entrance of said first member.

18. A closure and loading device for closing an opening in an aircraft fuselage and for functioning as a cargo loading and unloading means from the fuselage when the aircraft is on the ground, said device including a ramp for closing a portion of the opening, means pivotally mounting the ramp on the fuselage, means connected to the fuselage and the ramp for moving the ramp from its closed position to a loading and unloading position, said ramp having extensible means for closing the remainder of the opening in the fuselage, means disposed within the ramp for moving the extensible means from a stored position within the ramp to its closed position, said ramp and said extensible means cooperating to form a streamlined continuation of the fuselage in their closed positions, said extensible means having means for cooperation with the fuselage and the ramp to seal the remainder of the opening, auxiliary ramp means stored on the ramp and forming an extension of the ramp when both the ramp and the auxiliary ramp means are in their loading and unloading positions, said auxiliary ramp means including at least one bridge of substantially lesser width than the ramp and at least one pad, and hinge means pivotally connecting said bridge to said ramp, said hinge means having means to permit lateral adjustment of said bridge with respect to said ramp, said pad being pivotally connected to said bridge at the end of the bridge remote from the ramp, means to limit the movement of said pad when the auxiliary ramp means is in its stored position, means to support the bridge in a substantially horizontal position, said support means including a first brace pivotally connected to said bridge adjacent the end nearest the ramp, a second brace pivotally connected to said bridge near its mid-point, means to maintain the braces in a stored position, and means to maintain the braces in their support position when the bridge is in the substantially horizontal position.

References Cited in the file of this patent

UNITED STATES PATENTS

| | | |
|---|---|---|
| 457,274 | Hall | Aug. 4, 1891 |
| 2,381,030 | Blackburn | Aug. 7, 1945 |
| 2,405,878 | Elwert | Aug. 13, 1946 |
| 2,759,691 | Weaver et al. | Aug. 21, 1956 |
| 2,793,907 | Hess et al. | May 28, 1957 |

FOREIGN PATENTS

| | | |
|---|---|---|
| 699,282 | Great Britain | Nov. 4, 1953 |